(12) United States Patent
Gibson et al.

(10) Patent No.: US 11,131,285 B2
(45) Date of Patent: Sep. 28, 2021

(54) VEHICLE ELECTRICAL SYSTEM AND METHODS

(71) Applicant: Ford Global Technologies, LLC, Dearborn, MI (US)

(72) Inventors: Alexander O'Connor Gibson, Ann Arbor, MI (US); David Lew, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 16/241,576

(22) Filed: Jan. 7, 2019

(65) Prior Publication Data

US 2020/0217290 A1 Jul. 9, 2020

(51) Int. Cl.
*F02N 11/08* (2006.01)
*B60R 16/033* (2006.01)
*B60R 16/023* (2006.01)

(52) U.S. Cl.
CPC ........ *F02N 11/087* (2013.01); *B60R 16/0238* (2013.01); *B60R 16/033* (2013.01); *F02N 11/0866* (2013.01)

(58) Field of Classification Search
None
See application file for complete search history.

(56) References Cited

U.S. PATENT DOCUMENTS

| 2002/0130555 | A1* | 9/2002 | Burke | F02N 11/0866 307/10.6 |
| 2012/0025601 | A1* | 2/2012 | Nefcy | H02J 7/34 307/9.1 |
| 2013/0264869 | A1 | 10/2013 | Klinkig et al. | |
| 2013/0320931 | A1* | 12/2013 | Yoshida | B60R 16/033 320/135 |
| 2014/0077592 | A1 | 3/2014 | Koch et al. | |
| 2014/0078630 | A1 | 3/2014 | Koch et al. | |
| 2015/0283963 | A1* | 10/2015 | Janarthanam | B60K 6/48 307/9.1 |

* cited by examiner

*Primary Examiner* — Jared Fureman
*Assistant Examiner* — Joel Barnett
(74) *Attorney, Agent, or Firm* — Geoffrey Brumbaugh; McCoy Russell LLP

(57) ABSTRACT

Systems and methods for supplying electrical power between two electric energy storage devices are disclosed. In one example, an electric isolation switch is held open after engine starting until a voltage of a first electric energy storage device and a voltage of a second electric energy storage device are within a threshold voltage of at least one predetermined voltage level.

6 Claims, 6 Drawing Sheets

VEHICLE ELECTRICAL SYSTEM AND METHODS

FIELD

The present description relates to systems and methods for distributing electrical power in a vehicle. The system and methods may be suitable a vehicle that includes more than one electrical power distribution bus.

BACKGROUND AND SUMMARY

A vehicle may include low voltage (e.g., 12 VDC) starter and a high voltage integrated starter/generator (ISG). In addition, the vehicle may include accessory electric loads that may be selectively electrically decoupled from the starter so that the accessory electric loads may not be exposed to low voltages that may result from supplying large amounts of electrical current to the starter during engine starting. An electric isolation switch may be selectively opened and closed to allow or prevent current flow between a primary electric energy storage device and an accessory electric energy storage device. In particular, the electric isolation switch may be opened to prevent current flow between the electric energy storage devices during engine cranking and starting. The electric isolation switch may be closed after engine cranking and starting so that both the primary and accessory electric energy storage devices may be charged via a belt integrated starter/generator (BISG), which may be a low voltage starter. However, the electric isolation switch may have limited current carrying capacity, and high electric current flow through the electric isolation switch may lead to degradation of the electric isolation switch. Therefore, it may be desirable to provide a way of reducing the possibility of high electric current flow through the electric isolation switch.

The inventors herein have recognized the above-mentioned issues and have developed a power delivery method for a vehicle, comprising: reducing a voltage of a low voltage primary electric energy storage device via a controller after starting an engine via power supplied by the low voltage primary electric energy storage device and before closing an electric isolation switch that selectively couples the low voltage primary electric energy storage device to a low voltage accessory electric energy storage device.

By reducing a voltage of a low voltage primary electric energy storage device, it may be possible to reduce electric current flow through an electric isolation switch that selectively couples and decouples the low voltage primary electric energy storage device from a low voltage accessory electric energy storage device. For example, if during engine cranking, the voltage of the low voltage accessory electric energy storage device is reduced by supplying electric power to ancillary vehicle electric power consumers, then a voltage of a low voltage primary electric energy storage device may be reduced so that current flow through the electric isolation switch may be reduced when the electric isolation switch is closed after engine cranking.

The present description may provide several advantages. In particular, the approach may reduce the possibility of isolation switch degradation. Further, the approach may increase a life span of an electric isolation switch. Further still, the approach may reduce abrupt changes in system voltage levels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
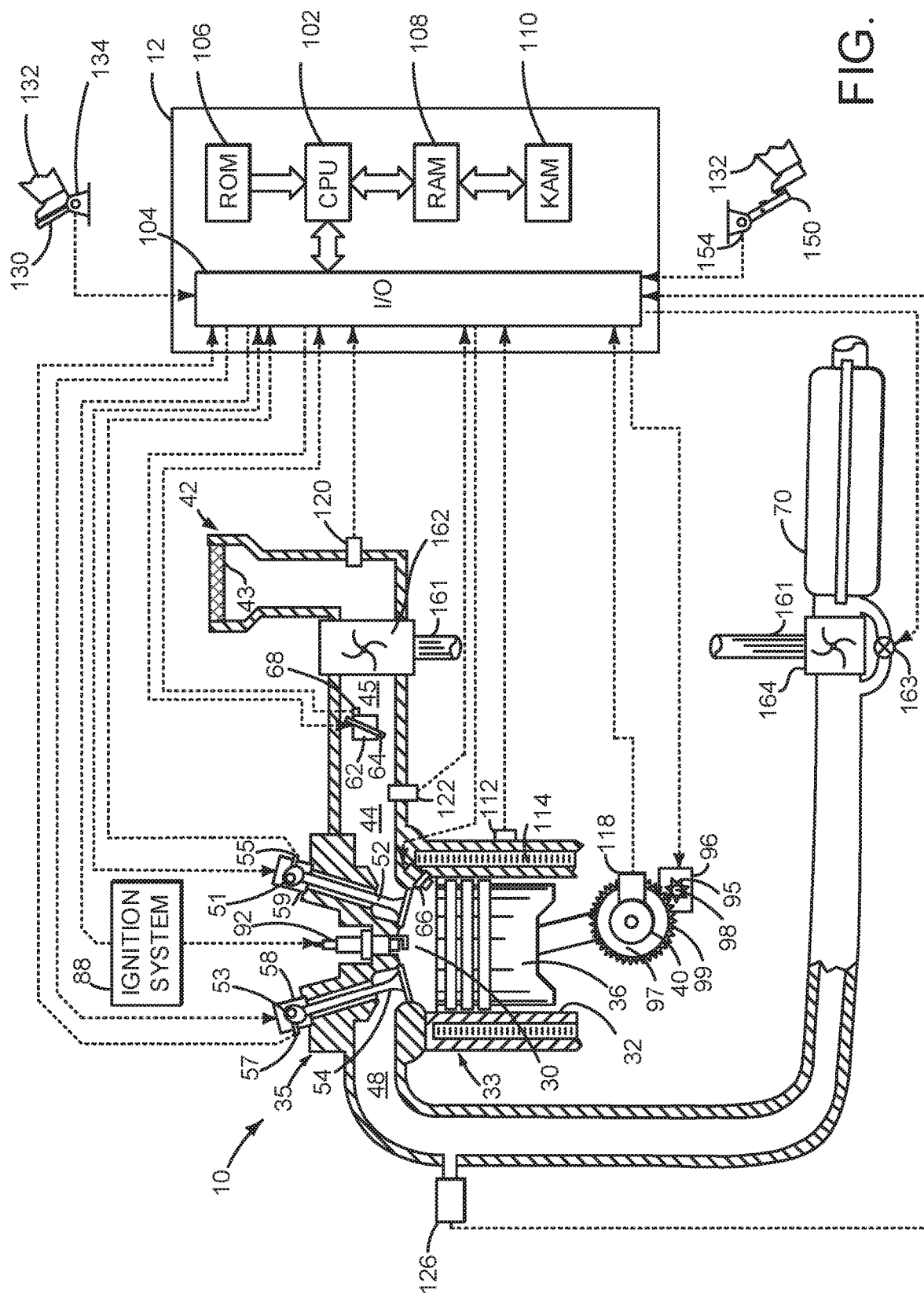
FIG. 1 is a schematic diagram of an engine for providing power to a vehicle electrical system.
Figure 2:
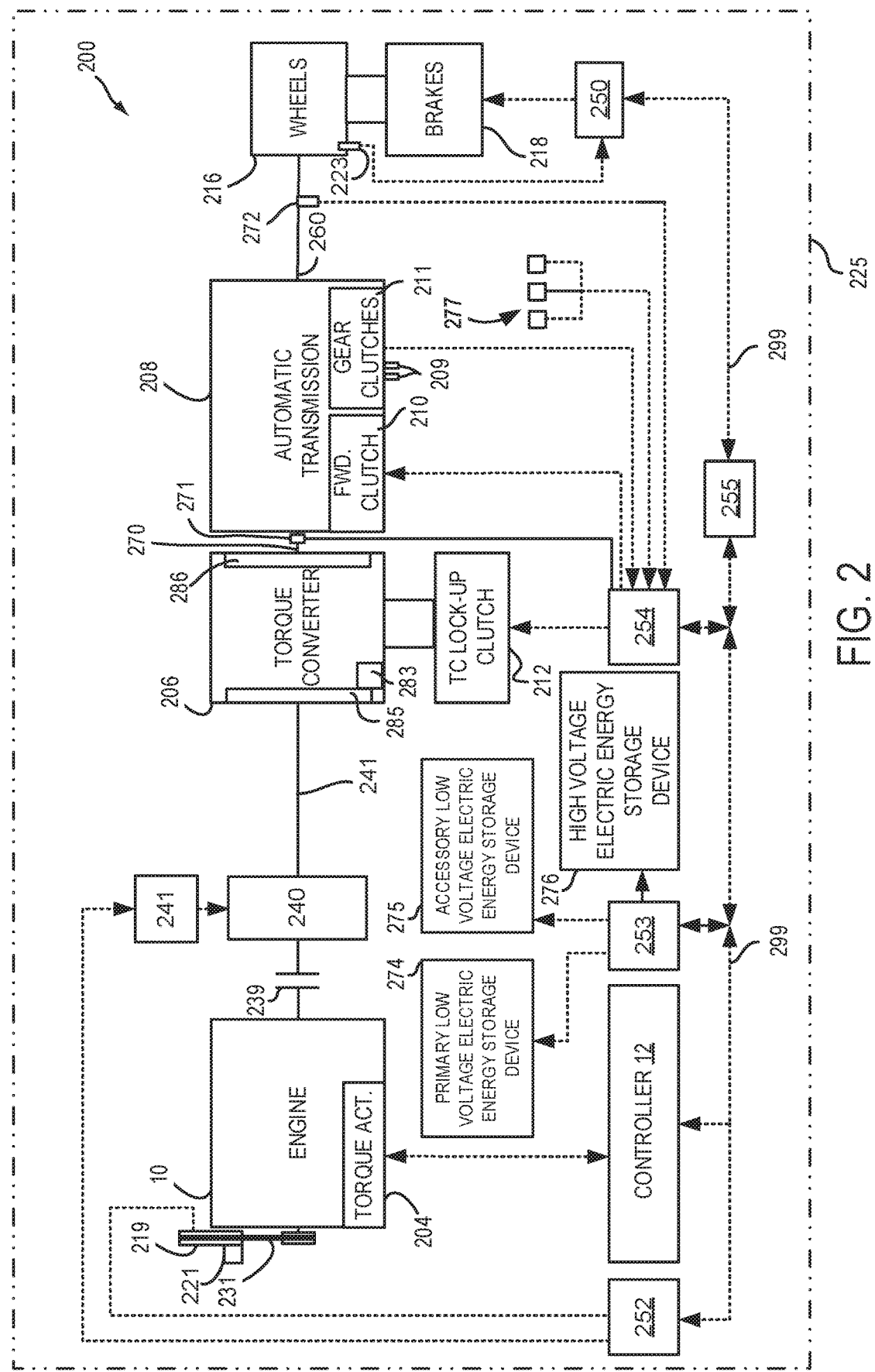
FIG. 2 is a schematic diagram of a vehicle driveline including electrical power sources.
Figure 3:
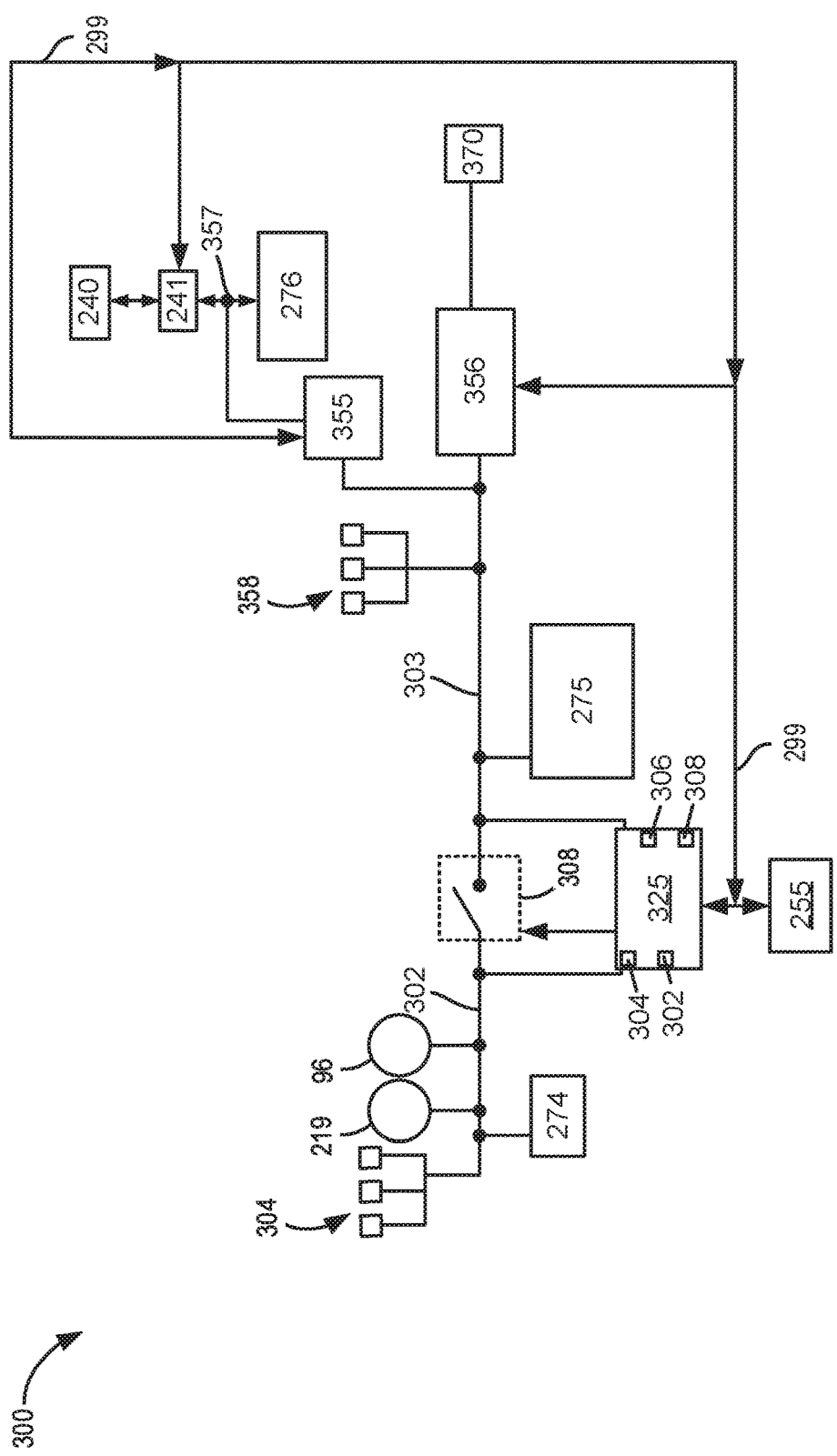
FIG. 3 shows an example vehicle electrical system configuration.

The present description is related to controlling electrical power delivered onboard and off-board of a vehicle that generates electrical power. The vehicle may generate electrical power via an internal combustion engine as shown in FIG. 1. The internal combustion engine may be included in a driveline or powertrain of a vehicle as shown in FIG. 2. The vehicle may include an electrical power distribution system as shown in FIG. 3. The vehicle electrical power distribution system may operate according to the sequence of FIG. 4. The method of FIGS. 5 and 6 may operate in cooperation with the system shown in FIGS. 1-3 to provide the sequences shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes), requests for engine starting and stopping, and indication of the engine running (e.g., combusting fuel). Further, the vehicle system controller 255 may provide commands to engine controller 12, electric machine controller 252, transmission controller 254, and brake controller 250 to achieve driver input requests and other requests that are based on vehicle operating conditions. In addition, each of the controllers may receive signals from the various sensors shown in FIG. 2. Each of the controllers may also employ one or more of the actuators shown in FIG. 2 to adjust driveline operation based on the received signals and instructions stored in memory of the respective controllers. For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10. Engine 10 may be started with an engine starting system shown in FIG. 1, via belt driven integrated starter/generator (BISG) 219. BISG 219 may provide electrical power to the vehicle's electrical system when operated as a generator. BISG 219 may provide torque to driveline 200 when operated as a motor. Speed of BISG 219 may be adjusted relative to engine speed via speed changing device 221, which may be a gear or pulley arrangement that changes a gear or pulley ratio between engine 10 and BISG 219. Further, torque of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53). BISG 219 may operate as a motor when supplied with electrical power via electric energy storage device 275 (e.g., high voltage (>30 volts) electrical energy storage device). BISG 219 may operate as a generator supplying electrical power to low voltage accessory (e.g., 12 VDC) electric energy storage device 275, which may also be referred to as second electric energy storage device, or primary low voltage (e.g., 12 VDC) electric energy storage device 274, which may also be referred to as first electric energy storage device. The output voltage of BISG 219 may be adjusted via adjusting a speed of BISG 219 and field current supplied to BISG 219 via controller 252.

An engine output torque may be transmitted to driveline disconnect clutch 239, and driveline disconnect clutch 239 may transfer engine torque to integrated starter/generator 240 and torque converter 206. Driveline disconnect clutch 239 may be selectively opened and closed. Driveline disconnect clutch 239 does not transfer torque when it is fully open. Driveline disconnect clutch 239 may be partially closed when ISG 240 is providing torque to start engine 10.

Inverter 241 may convert direct current (DC) supplied by high voltage electric energy storage device 276, which may be referred to as third electric energy storage device, into alternating current (AC) when ISG 240 is operated as a motor. Inverter 241 may convert AC power generated by ISG 240 into DC for storing in high voltage electric energy storage device 276. Driveline disconnect clutch 239 and ISG 240 are coupled to torque converter 206.

Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque or power. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275 and/or electric energy storage device 276, a charging torque (e.g., a negative BISG torque or a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then commands friction brakes 218 (e.g., desired friction brake wheel torque) and/or ISG 240 via inverter 241 to provide the requested braking torque.

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from BISG 219 by adjusting current flowing to and from field and/or armature windings of BISG 219 as is known in the art. Similarly, electric machine controller 252 may control torque output and electrical energy production from ISG 240 by adjusting current flowing to and from field and/or armature windings of ISG 240 as is known in the art. Electrical output from ISG 240 and BISG 219 may be provided in a stationary mode where the transmission is in park or neutral. Alternatively, electrical output from the ISG 240 and BISG 219 may be provided in a non-stationary mode where the vehicle is traveling on a road.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), alternator temperature sensors, and BISG temperature sensors, and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3, an example electrical system 300 for vehicle 225 is shown. Electrical system 300 includes a first low voltage electric bus 302 and a second low voltage electric bus 303. Low voltage electric bus 302 carries low voltage (e.g., 12 VDC) power between various vehicle devices including but not limited to BISG 219, starter 96, and low voltage primary electric energy storage device 274. Low voltage electric bus 302 may also route low voltage power to low voltage vehicle electrical loads 304. Low voltage vehicle electrical loads 304 may include but are not limited to fuel injectors, electronic throttles, lighting devices, oxygen sensors, valve phase adjusting devices, and engine ignition systems.

Electric system 300 also includes an electric isolation switch 308 for electrically isolating first low voltage electric bus 302 from second low voltage electric bus 303. First electric isolation switch 308 may be a contactor or a solid state device.

Second low voltage bus 303 carries low voltage power between low voltage accessory electric energy storage device 275, inverter 356, optional DC/DC converter 355, and low voltage electric power consumers 358. Low voltage electric power consumers 358 may include, but are not limited to resistive window defrosters, electric power steering systems, display panels, and infotainment systems. Inverter 356 may convert low voltage DC power into AC power for supplying electrical power to devices 370 (e.g., saws, radios, televisions, etc.) that are external to vehicle 225. Inverter 356 may output 120 VAC or 240 VAC to off board devices 370. Off board devices may include but are not limited to lighting, drills, saws, compressors, and other alternating current powered devices. DC/DC converter may increase a voltage of second low voltage bus 303 to supply charge to high voltage bus 357 (e.g., >30 volts DC) and low voltage accessory electric energy storage device 275. DC/DC converter 355 may supply electrical charge from high voltage bus 357 to second low voltage bus 303 and electrical devices connected thereto. Alternatively, DC/DC converter 355 may supply electrical charge from second low voltage bus 303 to high voltage bus 357 to power ISG 240. High voltage bus 357 may transfer electric charge between DC/DC converter 355, inverter 241, and high voltage electric energy storage device (e.g., battery) 276.

BISG 219 may supply low voltage power to low voltage electric bus 302 and low voltage primary electric energy storage device when electrical isolation switch 308 is open or closed. Output voltage of BISG 219 may be adjusted to be above or below a voltage of low voltage primary electric energy storage device 274. For example, a field current of BISG 219 may be adjusted to adjust output voltage of BISG 219. Similarly, voltage output from DC/DC converter 355 may be adjusted to a voltage that is above or below a voltage of low voltage accessory electric energy storage device 275. For example, timing of charging and discharging an electric energy storage device with DC/DC converter 355 may be adjusted to adjust an output voltage of DC/DC converter 355.

Low voltage primary electric energy storage device 274 and low voltage accessory electric energy storage device 275 operate within a first voltage range (e.g., between 8 and 16 volts DC) and high voltage electric energy storage device 276 operates in a second voltage range (e.g., >30 volts DC).

Electric system 300 also includes a voltage quality module or controller 325 that may communicate with vehicle system controller 255. Voltage quality controller 325 may selectively open and close electric isolation switch 308. Electric charge is not transferred between first low voltage bus 302 and second low voltage bus 303 when electric isolation switch 308 is in an open state. Electric charge may be transferred between first low voltage bus 302 and second low voltage bus 303 when electric isolation switch 308 is in a closed state. Voltage quality controller 325 may determine voltages of low voltage primary electric energy storage device 274 and low voltage accessory electric energy storage device 275 via input and output circuitry 304 (e.g., analog inputs/outputs and digital inputs/outputs). Voltage quality controller 325 includes read-only (non-transitory) memory 306, a CPU 302, and random access memory 308. However, in some examples, voltage quality controller 325 may simply include combinational logic and analog circuitry. Voltage quality controller 325 may receive instructions from vehicle controller 255 that a request to start engine 10 is present and to open electric isolation switch 302. Voltage quality controller 325 may also request that vehicle system controller 255 increases or decreases voltage and/or current delivered to first low voltage bus 302 and second low voltage bus 303 via BISG 219 and DC/DC converter 355. Further, voltage quality controller 325 may also request that vehicle system controller 255 increase or decrease electrical loads that are applied to first low voltage bus 302 and second low voltage bus 303 via BISG 219, DC/DC converter 355, low voltage vehicle electric loads 304, and low voltage electric power consumers 358.

Thus, the electric system of FIGS. 1-3 provides for a system for delivering electrical power of a vehicle, comprising: an engine; a belt integrated starter/generator (BISG) mechanically coupled to the engine and electrically coupled to a first electric energy storage device that operates in a first voltage range; a second electric energy storage device that operates in the first voltage range; a third electric energy storage device that operates in a second voltage range, the second voltage range higher than the first voltage range; an electric isolation switch that selectively electrically couples the first electric energy storage device to the second electric energy storage device; a DC/DC converter directly electrically coupled to the second electric energy storage device and the third electric energy storage device; a controller including executable instructions stored in non-transitory memory to lower a voltage of the DC/DC converter and increase electrical loads applied to the second electric energy conversion device in response to a voltage of the first electric energy conversion device being less than a threshold voltage while the electric isolation switch is open.

In some examples, the system further comprises additional instructions to open the electric isolation switch in response to a request to start the engine. The system further comprises additional instructions to close the electric isolation switch in response to a voltage of the second electric energy storage device being within a threshold voltage of a voltage of the first electric energy storage device. The system further comprises additional instructions to increase a voltage supplied via the BISG to the first electric energy storage device in response to the voltage of the first electric energy conversion device being less than the threshold voltage while the electric isolation switch is open. The system includes where the electrical loads include a window defroster. The system further comprises additional instructions to reduce a voltage of the first electric energy storage device after starting an engine via power supplied by the first electric energy storage device and before closing the electric isolation switch.

Figure 4:
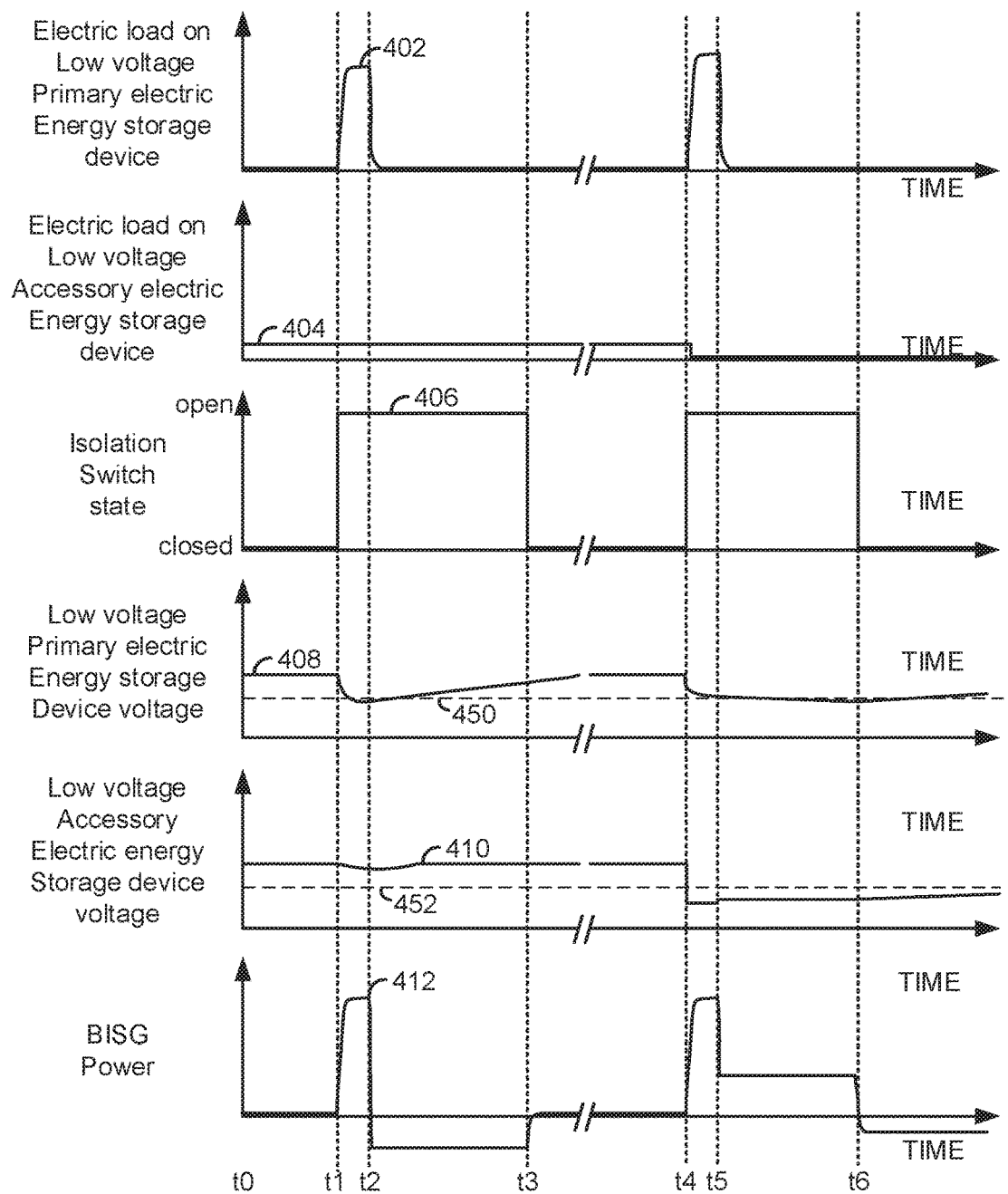
FIG. 4 shows an example electrical system operating sequence.

Referring now to FIG. 4, a prophetic example vehicle electrical system operating sequence is shown. The sequence of FIG. 4 may be provided according to the method of FIGS. 5 and 6 in cooperation with the system of FIGS. 1-3. The plots shown in FIG. 4 occur at the same time and are aligned in time. The // marks along the horizontal axis represent a break in time and the duration of the break in time may be long or short. The vertical lines at times t0-t6 represent times of interest in the sequence.

The first plot from the top of FIG. 4 is a plot electric load or power consumed from the low voltage primary electric energy storage device (e.g., 274) versus time. The vertical axis represents electric load or power consumed from the low voltage primary electric energy storage device and the amount of electric load or power consumed from the low voltage primary electric energy storage device increases in the direction of the vertical axis arrow. The horizontal axis represents time and time increases from the left side of the figure to the right side of the figure. Trace 402 represents electric load or power consumed from the low voltage primary electric energy storage device.

The second plot from the top of FIG. 4 is a plot electric load or power consumed from the low voltage accessory electric energy storage device (e.g., 275) versus time. The vertical axis represents electric load or power consumed from the low voltage accessory electric energy storage device and the amount of electric load or power consumed from the low voltage accessory electric energy storage device increases in the direction of the vertical axis arrow. The horizontal axis represents time and time increases from the left side of the figure to the right side of the figure. Trace 404 represents electric load or power consumed from the low voltage accessory electric energy storage device.

The third plot from the top of FIG. 4 is a plot of electric isolation switch operating state versus time. The vertical axis represents the operating state of the electric isolation switch. The electric isolation switch is open when trace 406 is at a higher level near the vertical axis arrow. The electric isolation switch is closed when trace 406 is at a lower level near the horizontal axis. The horizontal axis represents time and time increases from the left side of the figure to the right side of the figure. Trace 406 represents the state of the electric isolation switch (e.g., 308).

The fourth plot from the top of FIG. 4 is a plot of low voltage primary electric energy storage device voltage versus time. The vertical axis represents low voltage primary electric energy storage device voltage, and the low voltage primary electric energy storage device voltage increases in the direction of the vertical axis arrow. The horizontal axis represents time and time increases from the left side of the figure to the right side of the figure. Trace 408 represents low voltage primary electric energy storage device voltage. Horizontal line 450 represents a threshold voltage. Closing of the electric isolation switch is prevented when low voltage primary electric energy storage device voltage (trace 408) is below threshold 450.

The fifth plot from the top of FIG. 4 is a plot of low voltage accessory electric energy storage device voltage versus time. The vertical axis represents low voltage accessory electric energy storage device voltage, and the low voltage accessory electric energy storage device voltage increases in the direction of the vertical axis arrow. The horizontal axis represents time and time increases from the left side of the figure to the right side of the figure. Trace 410 represents low voltage accessory electric energy storage device voltage. Horizontal line 452 represents a threshold voltage. Closing of the electric isolation switch is prevented when low voltage accessory electric energy storage device voltage (trace 410) is below threshold 452.

The sixth plot from the top of FIG. 4 is a plot of BISG power versus time. The vertical axis represents BISG power. The BISG is operating as a motor and outputting mechanical work when trace 412 is above the horizontal axis. The amount of mechanical work that is provided by the BISG increases in the direction of the vertical axis arrow. The BISG is operating as a generator and consuming mechanical work from the engine when trace 412 is below the horizontal axis. The amount of power consumed from the engine increases in a direction (down) away from the horizontal axis. The horizontal axis represents time and time increases from the left side of the figure to the right side of the figure. Trace 412 represents BISG power.

At time t0, the engine of the vehicle is stopped (not shown) and the electric load that is applied to the low voltage primary electric energy storage device is low. The electric load that is applied to the low voltage accessory electric energy storage device is also low and the electric isolation switch is closed. The electric isolation switch is closed so that the voltage of the low voltage primary electric energy storage device is equal to a voltage of the low voltage accessory electric energy storage device and so that charge may be freely delivered between the two electric energy storage devices. The BISG power output is zero.

At time t1, a request to start the engine is made (not shown) and the electric isolation switch is opened in response to the request to start the engine so that voltage of the second low voltage electric bus is not reduced when the BISG cranks (e.g., rotates) the engine since the starter and BISG are electrically coupled to the first low voltage bus. Further, opening the electric isolation switch allows low voltage electric power consumers that are electrically coupled to the second low voltage electric bus to be operated via electric charge that is supplied via the low voltage accessory electric energy storage device. The electrical load on the low voltage primary electric energy storage devices increases shortly after the electric isolation switch opens in response to the starter cranking the engine (not shown). The electric load that is applied to the low voltage accessory electric energy storage device remains low and the voltage of the low voltage primary electric energy storage device begins to decrease as electric power is drawn from the low voltage primary electric energy storage device by BISG or the starter. The voltage of the low voltage accessory electric energy storage device begins to decrease as electric power is drawn from the low voltage accessory electric energy storage device by electrical power consumers that are electrically coupled to the second low voltage bus. The BISG power increases after the electric isolation switch is opened closed as the BISG cranks (e.g., rotates) the engine.

At time t2, engine cranking is complete and the engine is started (not shown). The BISG stops cranking the engine and the BISG power is reduced when the engine is started (e.g., combusting fuel and rotating under its own power). Shortly after time t2, the BISG transitions from operating as a motor to operating as a generator so that the low voltage primary electric energy storage device may be charged via the BISG. The BISG receives mechanical input power from the engine. The electric load on the low voltage primary electric energy storage device is reduced to zero when the BISG ceases to crank the engine. The electric isolation switch remains open since the voltage of the low voltage primary electric energy storage device is less than threshold 450. Keeping the electric isolation switch open prevents high current flows through the electric isolation switch, thereby reducing the possibility of degrading the low voltage primary electric energy storage device. The electric load that is applied to the low voltage accessory electric energy storage device remains low and the voltage of the low voltage primary electric energy storage device has been reduced a small amount, but it remains above threshold 452.

Between time t2 and time t3, the BISG continues to charge the low voltage primary electric energy storage device and the voltage of the low voltage primary electric energy storage device increases. The electric isolation switch remains open and no electrical load is applied to the low voltage primary electric energy storage device. The load that is applied to the low voltage accessory electric energy storage device remains low. The voltage of the low voltage accessory electric energy storage device increases as the low voltage accessory electric energy storage device is charged via the DC/DC converter (not shown).

At time t3, the electric isolation switch is closed in response to the voltage of the low voltage primary electric energy storage device being within a threshold voltage of the low voltage accessory electric energy storage device. The BISG ceases charging the low voltage primary electric energy storage device shortly thereafter and there is no electrical load applied to the low voltage primary electric energy storage device. The electrical load that is applied to the low voltage accessory electric energy storage device remains low.

In this way, the low voltage primary electric energy storage device may be charged to a higher voltage level when the low voltage primary electric energy storage device is discharged to a level that is less than a threshold voltage when the electric isolation switch is open while the engine is being cranked. By increasing the voltage of the low voltage primary electric energy storage device, current flow through the electric isolation switch may be reduced when the electric isolation switch is closed. The reduction in current flow may be attributed to a low differential voltage across the electric isolation switch.

After time t3 and before time t4, the engine of the vehicle is stopped (not shown) and the electric load that is applied to the low voltage primary electric energy storage device is low. The electric load that is applied to the low voltage accessory electric energy storage device is also low and the electric isolation switch is closed. The electric isolation switch is closed so that the voltage of the low voltage primary electric energy storage device is equal to a voltage of the low voltage accessory electric energy storage device and so that charge may be freely delivered between the two electric energy storage devices. However, in this example, a cell of the low voltage accessory electric energy storage device is degraded so current flows from the low voltage primary electric energy storage device to the low voltage accessory electric energy storage device (not shown). The ISG power output is zero.

At time t4, a request to start the engine is made (not shown) and the electric isolation switch is opened in response to the request to start the engine so that voltage of the second low voltage electric bus is not reduced when the BISG cranks (e.g., rotates) the engine since the starter and BISG are electrically coupled to the first low voltage bus. The voltage of the low voltage accessory electric energy storage device drops when the electric isolation switch is opened because one or more cells in the low voltage accessory electric energy storage device are degraded. The electrical load applied to the low voltage primary electric energy storage devices increases shortly after the electric isolation switch opens in response to the BISG or the starter cranking the engine (not shown). The electric load that is applied to the low voltage accessory electric energy storage device is decreased via load shedding (e.g., decoupling of electrical loads from the power source) to increase the voltage of the low voltage accessory electric energy storage device so that it is closer to the voltage of the low voltage primary electric energy storage device. The voltage of the low voltage accessory electric energy storage device also begins to decrease further as electric power is drawn from the low voltage accessory electric energy storage device by electrical power consumers that are electrically coupled to the second low voltage bus. The BISG power consumption increases after the electric isolation switch is closed as the BISG cranks (e.g., rotates) the engine.

At time t5, engine cranking is complete and the engine is started (not shown). The BISG stops cranking the engine and the BISG power is reduced when the engine is started. Shortly after time t5, the BISG transitions from cranking the engine to supplying power to the driveline to propel the vehicle. In other words, the BISG provides a portion of the driver demand power or torque and the engine and/or the ISG provide the remaining portion of the driver demand power or torque. The electric load applied to the low voltage primary electric energy storage device is reduced. The electric isolation switch remains open since the voltage of the low voltage accessory electric energy storage device is less than threshold 452. The electrical load applied to the low voltage accessory electric energy storage device remains at a lower level (e.g., zero) due to electric load shedding. The voltage of the low voltage primary electric energy storage device continues to decline as it supplies electric power to the BISG. The voltage of the low voltage accessory electric energy storage device remains at its previous level (below threshold 452) and the BISG power levels off at a level where it supplies positive torque to the driveline.

Between time t5 and time t6, the BISG continues to discharge the low voltage primary electric energy storage device and the voltage of the low voltage primary electric energy storage device continues to decline. The electric isolation switch remains open and no electrical load is applied to the low voltage primary electric energy storage device. The load that is applied to the low voltage accessory electric energy storage device is zero.

At time t6, the electric isolation switch is closed in response to the voltage of the low voltage primary electric energy storage device being within a threshold voltage of the low voltage accessory electric energy storage device. The BISG ceases discharging the low voltage primary electric energy storage device and it begins charging the low voltage primary electric energy storage device and the low voltage accessory electric energy storage device shortly thereafter. There is no electrical load applied to the low voltage primary electric energy storage device and the electrical load that is applied to the low voltage accessory electric energy storage device is also zero.

In this way, the low voltage primary electric energy storage device may be discharged to a lower voltage level when the low voltage accessory electric energy storage device is at a low voltage level when the electric isolation switch is open while the engine is being cranked. By decreasing the voltage of the low voltage primary electric energy storage device, current flow through the electric isolation switch may be reduced when the electric isolation switch is closed. The reduction in current flow may be attributed to a low differential voltage across the electric isolation switch.

Figure 5:
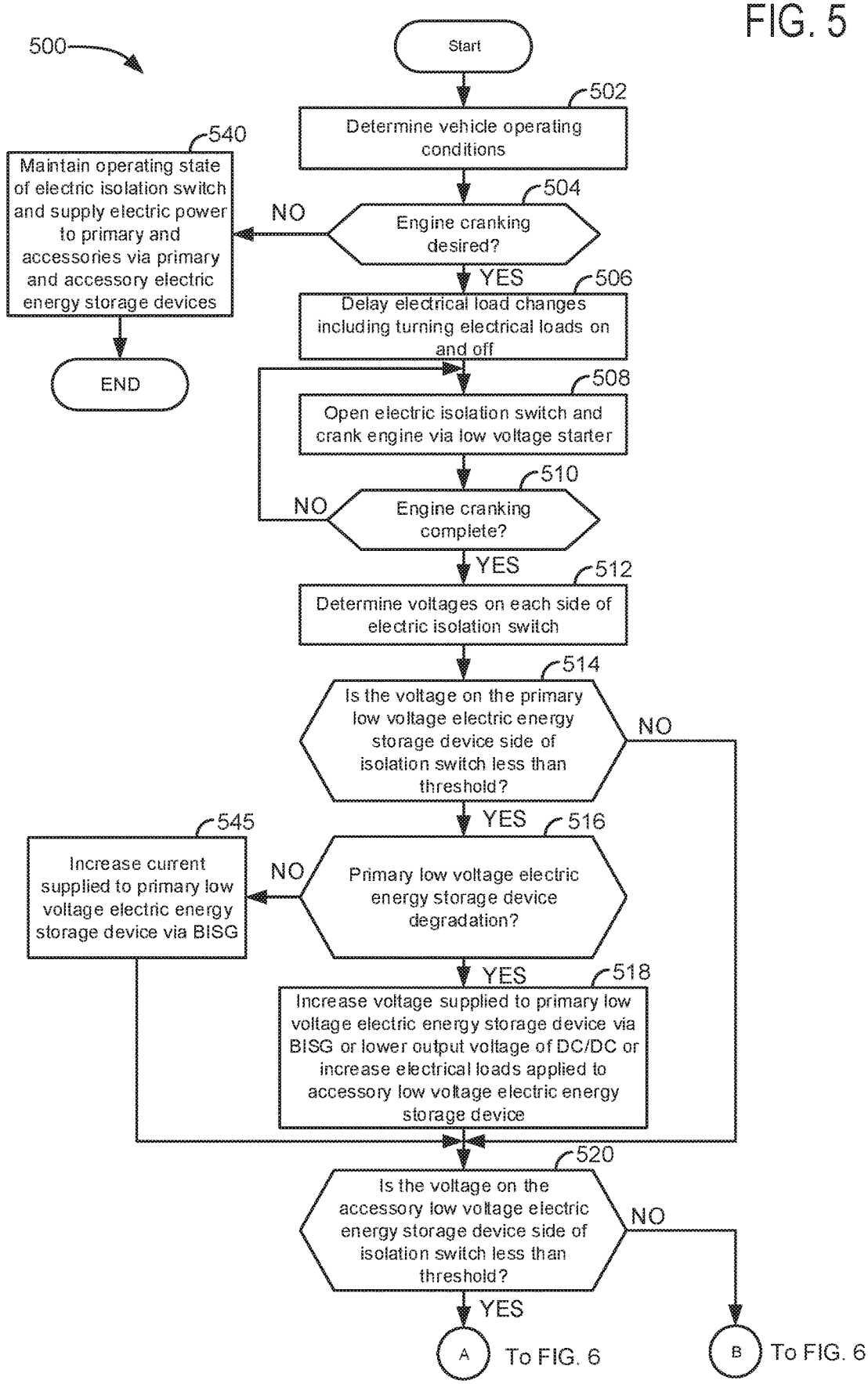
FIGS. 5 and 6 show an example method for operating a vehicle electrical system.
Figure 6:
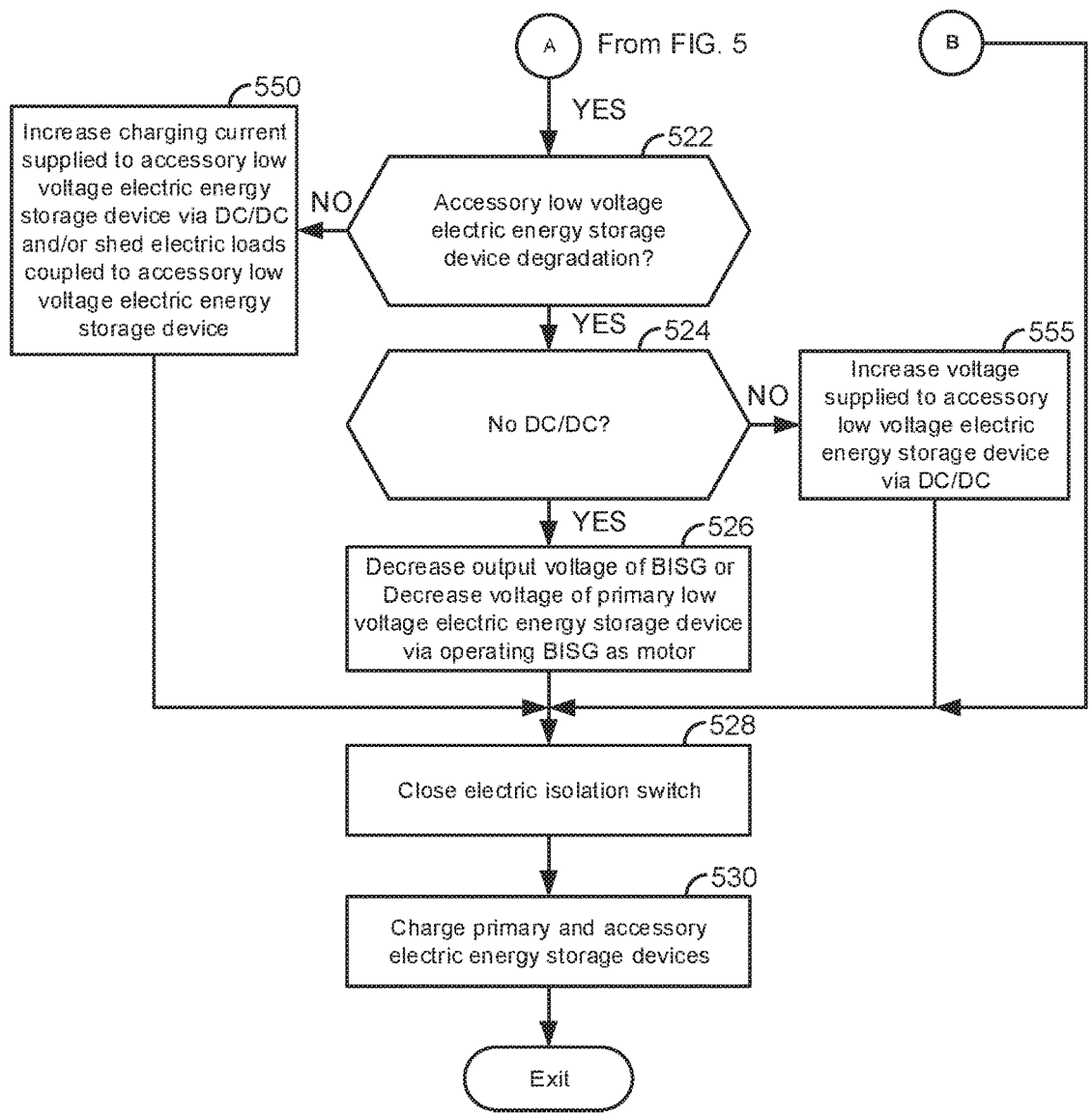

Referring now to FIGS. 5 and 6, a method for operating an electrical system of a vehicle is shown. The method of FIGS. 5 and 6 may provide the sequence shown in FIG. 4 in cooperation with the system of FIGS. 1-3. Further, at least portions of the method of FIGS. 5 and 6 may be incorporated into a controller as executable instructions stored in non-transitory memory, while other portions of the method may be actions performed in the physical world via the system.

At 502, method 500 determines vehicle operating conditions. Vehicle operating conditions may be determined via the controller receiving input from the various vehicle sensors. In one example, vehicle operating conditions may include but are not limited to vehicle speed, engine operating state (e.g., off (not combusting fuel) or on (combusting fuel)), electric isolation switch operating state (e.g., open or closed), electrical load applied to the low voltage primary electric energy storage device, electrical load applied to the low voltage accessory electric energy storage device, voltage of the low voltage primary electric energy storage device, voltage of the low voltage accessory electric energy storage device, BISG power, driver demand power, and vehicle speed. Method 500 proceeds to 504.

At 504, method 500 judges if there is an engine cranking (e.g., rotating the engine via the BISG or starter) request or if engine cranking is desired. Method 500 may request engine cranking in response to driver demand torque or power exceeding a threshold level or in response to state of charge (SOC) of an electric energy storage device being less than a threshold. If method 500 judges that there is an engine cranking request or if engine cranking is desired, the answer is yes and method 500 proceeds to 506. Otherwise, the answer is no and method 500 proceeds to 540.

At 540, method 500 maintains the operating state of the electric isolation switch (e.g., 308) and supplies electric power to electric consumers that are electrically coupled to the first and second low voltage buses. The electric power may be supplied via the BISG, DC/DC converter, the low voltage accessory electric energy storage device, the low voltage primary electric energy storage device, or a combination thereof. Further, the engine may remain on or running or it may remain stopped. The vehicle may be propelled via the engine and the ISG, the engine and BISG, or solely via the ISG. Method 500 proceeds to exit.

At 506, method 500 suspends and delays changes to electrical loads that may be applied to first low voltage bus and the second low voltage bus. For example, if a vehicle occupant attempts to activate a rear window defroster after a request to crank the engine and before the engine is started, the rear window may not be activated until the engine is started. In some examples, method 500 may also prevent electrical loads from being decoupled from the first and/or second low voltage bus after a request to crank the engine and before the engine is started. Method 500 proceeds to 508.

At 508, method 500 opens the electric isolation switch and decouples the first low voltage bus from the second low voltage bus. In addition, electric devices that are electrically coupled to the first low voltage bus are electrically isolated from electric devices that are electrically coupled to the second low voltage bus by opening the electric isolation switch. Method 500 also cranks the engine via the BISG or the starter. Method 500 proceeds to 510.

At 510, method 500 judges if engine cranking is complete. Method 500 may judge that engine cranking is complete when engine speed is greater than a threshold speed. If method 500 judges that engine cranking is complete, the answer is yes and method 500 proceeds to 512. Otherwise, the answer is no and method 500 returns to 508.

At 512, method 500 determines voltages on each side of the electric isolation switch. In one example, method 500 determines a voltage on a first side of the electric isolation switch by determining a voltage of the first low voltage bus. Method 500 determines a voltage on a second side of the electric isolation switch by determining a voltage of the second low voltage bus. The voltages may be determined via a voltage quality module and the voltages may be communicated to the vehicle system controller. By determining the voltages on each side of the electric isolation switch, it may be inferred that current flow through the electric isolation switch may be high or low if the electric isolation switch is closed. Method 500 proceeds to 514 after determining the voltages on both sides of the electric isolation switch.

At 514, method 500 judges if a voltage on the side of the electric isolation switch that is electrically coupled to the first low voltage bus and to the low voltage primary electric energy storage device is less than a first threshold voltage. The first threshold voltage level may be empirically determined via monitoring the voltage of the first low voltage bus and monitoring electric current flow through the electric isolation switch when the electric isolation switch is closed. If method 500 judges that the voltage on the side of the electric isolation switch that is electrically coupled to the first low voltage bus and to the low voltage primary electric energy storage device is less than a first threshold voltage, then the answer is yes and method 500 proceeds to 516. Otherwise, the answer is no and method 500 proceeds to 520.

Alternatively, method 500 may judge if the voltage on the side of the electric isolation switch that is electrically coupled to the first low voltage bus and to the low voltage primary electric energy storage device is less than a threshold voltage away from the voltage on the side of the electric isolation switch that is electrically coupled to the second low voltage bus and to the low voltage accessory electric energy storage device. If so, the answer is yes and method 500 proceeds to 516. Otherwise, the answer is no and method 500 proceeds to 520.

At 516, method 500 judges if the low voltage primary electric energy storage device is degraded. If so, the answer is yes and method 500 proceeds to 518. Otherwise, the answer is no and method 500 proceeds to 545.

In one example, method 500 may judge that the low voltage primary electric energy storage device is degraded if a voltage of the low voltage primary electric energy storage device remains below a threshold voltage after charging the low voltage primary electric energy storage device. Further, method 500 may judge that the low voltage primary electric energy storage device is degraded if a time to charge the low voltage primary electric energy storage device exceeds a threshold amount of time.

At 545, method 500 increases an amount of current supplied to the low voltage primary electric energy storage device via the BISG. The BISG is operated in a generator mode and it supplies an elevated amount of electrical current to the low voltage primary electric energy storage device so that the voltage of the low voltage primary electric energy storage device may approach the voltage of the low voltage accessory electric energy storage device. Method 500 may supply an elevated level of electric current to the low voltage primary electric energy storage device until the voltage of the low voltage primary electric energy storage device is within a threshold voltage of the low voltage accessory electric energy storage device. Method 500 may cease to supply an elevated level of electric current to the low voltage primary electric energy storage device when a voltage of the low voltage accessory electric energy device is within a voltage of the low voltage primary electric energy device. Method 500 proceeds to 520.

At 518, method 500 increases a voltage that is applied to the first low voltage bus and the low voltage primary electric energy storage device via increasing an output voltage of the BISG. Alternatively, or in addition, method 500 may lower an output voltage of the DC/DC converter (e.g., 355) supplying electrical charge to the second low voltage bus, if present, so that the voltage of the low voltage accessory electric energy storage device may be reduced to be within a threshold voltage of a voltage of the low voltage primary electric energy storage device. Further, method 500 may increase the electrical load that is applied to the low voltage accessory electric energy storage device so that the voltage of the low voltage accessory electric energy device may be reduced to be within a threshold voltage of a voltage of the low voltage primary electric energy storage device. For example, a resistive rear window defroster may be activated to reduce the voltage of the low voltage accessory electric energy storage device. Method 500 may increase BISG output voltage to increase the voltage of the low voltage primary electric energy storage device, and/or lower output voltage of the DC/DC converter, and/or increase electrical loads applied to the low voltage accessory electric energy device, until a voltage of the low voltage accessory electric energy device is within a voltage of the low voltage primary electric energy device. Method 500 may cease to increase BISG output voltage to increase the voltage of the low voltage primary electric energy storage device, and/or lower output voltage of the DC/DC converter, and/or increase electrical loads applied to the low voltage accessory electric energy device when a voltage of the low voltage accessory electric energy device is within a voltage of the low voltage primary electric energy device. Method 500 proceeds to 520.

At 520, method 500 judges if a voltage on the side of the electric isolation switch that is electrically coupled to the second low voltage bus and to the low voltage accessory electric energy storage device is less than a second threshold voltage. The second threshold voltage level may be empirically determined via monitoring the voltage of the second low voltage bus and monitoring electric current flow through the electric isolation switch when the electric isolation switch is closed. If method 500 judges that the voltage on the side of the electric isolation switch that is electrically coupled to the second low voltage bus and to the low voltage accessory electric energy storage device is less than a second threshold voltage, then the answer is yes and method 500 proceeds to 522. Otherwise, the answer is no and method 500 proceeds to 528.

Alternatively, method 500 may judge if the voltage on the side of the electric isolation switch that is electrically coupled to the second low voltage bus and to the low voltage accessory electric energy storage device is less than a threshold voltage away from the voltage on the side of the electric isolation switch that is electrically coupled to the first low voltage bus and to the low voltage primary electric energy storage device. If so, the answer is yes and method 500 proceeds to 522. Otherwise, the answer is no and method 500 proceeds to 528.

At 522, method 500 judges if the low voltage accessory electric energy storage device is degraded. If so, the answer is yes and method 500 proceeds to 524. Otherwise, the answer is no and method 500 proceeds to 550.

In one example, method 500 may judge that the low voltage primary electric energy storage device is degraded if a voltage of the low voltage accessory electric energy storage device remains below a threshold voltage after charging the low voltage primary electric energy storage device. Further, method 500 may judge that the low voltage accessory electric energy storage device is degraded if a time to charge the low voltage accessory electric energy storage device exceeds a threshold amount of time.

At 550, method 500 increases an amount of current supplied to the low voltage accessory electric energy storage device via the DC/DC converter (e.g., 355). The DC/DC converter supplies electric charge from the high voltage electric energy storage device to the low voltage accessory electric energy storage device. In addition, method 500 may lower the electrical load that is applied to the low voltage accessory electric energy storage device via commanding off electric power consumers that are electrically coupled to the second low voltage bus. Method 500 may supply an elevated level of electric current to the low voltage accessory electric energy storage device until the voltage of the low voltage accessory electric energy storage device is within a threshold voltage of the low voltage primary electric energy storage device. Method 500 may cease to supply an elevated level of electric current to the low voltage accessory electric energy storage device when a voltage of the low voltage accessory electric energy device is within a voltage of the low voltage primary electric energy device. Method 500 proceeds to 528.

At 524, method 500 judges if n DC/DC converter is present in the system. If there is no DC/DC converter, the answer is yes and method 500 proceeds to 526. Otherwise, if there is a DC/DC converter in the system, the answer is no and method 500 proceeds to 555.

At 555, method 500 increases a voltage output level of the DC/DC converter to increase a voltage level of the low voltage accessory electric energy storage device. The voltage output level of the DC/DC converter may be increased until a voltage level of the low voltage accessory electric energy storage device is within a threshold voltage of the low voltage primary electric energy storage device. Method 500 may cease to increase the voltage output of the DC/DC converter when a voltage of the low voltage accessory electric energy device is within a voltage of the low voltage primary electric energy device. Method 500 proceeds to 528.

At 526, method 500 decreases an output voltage of the BISG to decrease a voltage of the low voltage primary electric energy storage device so that the voltage of the low voltage primary electric energy storage device may be reduced to be within a threshold voltage of a voltage of a voltage of the low voltage accessory electric energy storage device. Alternatively, the BISG may be operated as a motor to supply a portion of the driver demand torque or power to the driveline. Thus, the BISG may be applied to propel the vehicle and reduce a voltage of the low voltage primary electric energy storage device when a voltage of the low voltage accessory electric energy storage device is less than a threshold voltage. Method 500 proceeds to 528.

At 528, method 500 closes the electric isolation switch when the voltage of the low voltage accessory electric energy storage device is within a threshold voltage of the low voltage primary electric energy storage device. Method 500 proceeds to 530.

At 530, method 500 charges primary and accessory electric energy storage devices via the BISG and/or the DC/DC converter. The primary and accessory electric energy storage devices may be charged until they reach a threshold level of charge. Method 500 proceeds to exit.

In this way, voltages of the first and second low voltage buses and voltages of the low voltage accessory and primary electric energy storage devices may be adjusted so that electric current flow through an electric isolation switch may be reduced after engine cranking. The lower current flow through the electric isolation switch may extend the life cycle of the electric isolation switch.

Thus, the method of FIGS. 5 and 6 provides for a power delivery method for a vehicle, comprising: reducing a voltage of a low voltage primary electric energy storage device via a controller after starting an engine via power supplied by the low voltage primary electric energy storage device and before closing an electric isolation switch that selectively couples the low voltage primary electric energy storage device to a low voltage accessory electric energy storage device. The method further comprises opening the electric isolation switch via the controller before cranking an engine. The method further comprises cranking the engine via an electric machine that is directly electrically coupled to the low voltage primary electric energy storage device, and where reducing the voltage is performed in response to a voltage of the primary electric energy storage device being greater than a voltage of the low voltage accessory electric energy storage device after starting the engine. The method includes where the voltage of the low voltage primary electric energy storage device is reduced via a belt integrated starter/generator (BISG).

In some examples, the method further comprises propelling a vehicle via a torque output from the BISG, the torque generated via electric power consumed reducing the voltage of the low voltage primary electric energy storage device. The method further comprises decreasing an output voltage of a belt integrated starter/generator (BISG) before closing the electric isolation switch, the BISG electrically coupled to the low voltage primary electric energy storage device when the electric isolation switch is open. The method further comprises closing the electric isolation switch in response to the voltage of the low voltage primary electric energy storage device being within a threshold voltage of a voltage of the low voltage accessory electric energy storage device.

The method of FIGS. 5 and 6 also provides for a power delivery method for a vehicle, comprising: increasing a voltage supplied to a low voltage accessory electric energy storage device via a DC/DC converter via a controller after starting an engine via power supplied by a low voltage primary electric energy storage device and before closing an electric isolation switch that selectively couples the low voltage primary electric energy storage device to the low voltage accessory electric energy storage device. The method includes where the voltage supplied to the low voltage accessory electric energy storage device via the DC/DC converter is increased in response to a voltage of the low voltage accessory electric energy storage device being less than a threshold voltage when the electric isolation switch is open. The method includes where the power is supplied to a belt integrated starter/generator, and further comprising: opening the electric isolation switch via the controller before cranking an engine. The method further comprises cranking the engine via an electric machine that is directly electrically coupled to the low voltage primary electric energy storage device.

In some examples, the method further comprises increasing a voltage supplied to the low voltage primary electric energy storage device via a belt integrated starter/generator after starting the engine and before closing the electric isolation switch. The method includes where the voltage is increased in response to a voltage of the low voltage primary electric energy storage device being less than a threshold voltage. The method includes where the DC/DC converter is electrically coupled to a high voltage electric energy storage device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system for delivering electrical power of a vehicle, comprising:
   an engine;
   a belt integrated starter/generator (BISG) mechanically coupled to the engine and electrically coupled to a first electric energy storage device that operates in a first voltage range;
   a second electric energy storage device that operates in the first voltage range;
   a third electric energy storage device that operates in a second voltage range, the second voltage range higher than the first voltage range;
   an electric isolation switch that selectively electrically couples the first electric energy storage device to the second electric energy storage device;
   a DC/DC converter directly electrically coupled to the second electric energy storage device and the third electric energy storage device;
   a controller including executable instructions stored in non-transitory memory to lower a voltage of the DC/DC converter and increase electrical loads applied to the second electric energy conversion device in response to a voltage of the first electric energy conversion device being less than a threshold voltage while the electric isolation switch is open.

2. The system of claim 1, further comprising additional instructions to open the electric isolation switch in response to a request to start the engine.

3. The system of claim 1, further comprising additional instructions to close the electric isolation switch in response to a voltage of the second electric energy storage device being within a threshold voltage of a voltage of the first electric energy storage device.

4. The system of claim 1, further comprising additional instructions to increase a voltage supplied via the BISG to the first electric energy storage device in response to the voltage of the first electric energy conversion device being less than the threshold voltage while the electric isolation switch is open.

5. The system of claim 1, where the electrical loads include a window defroster.

6. The system of claim 1, further comprising additional instructions to reduce a voltage of the first electric energy storage device after starting an engine via power supplied by the first electric energy storage device and before closing the electric isolation switch.

* * * * *